United States Patent [19]

Hashino et al.

[11] 4,208,508
[45] Jun. 17, 1980

[54] SEMIPERMEABLE MEMBRANES OF POLYARYL ETHER SULFONES

[75] Inventors: Yasuo Hashino, Kashiwa; Fusakazu Hayano, Fuji; Kenji Ito, Nobeoka, all of Japan

[73] Assignee: Asahi Kasei Kogyo Kabushiki Kaisha, Osaka, Japan

[21] Appl. No.: 922,772

[22] Filed: Jul. 7, 1978

[30] Foreign Application Priority Data

Jul. 8, 1977 [JP] Japan .................. 52/80913

[51] Int. Cl.² .................. B01D 13/00; B01D 13/04
[52] U.S. Cl. .................. 528/175; 210/500 M; 528/174
[58] Field of Search .................. 528/174, 175; 210/500 M

[56] References Cited

U.S. PATENT DOCUMENTS

| | | | |
|---|---|---|---|
| 3,615,024 | 10/1971 | Michaels | 210/490 |
| 3,830,781 | 8/1974 | Leslie et al. | 528/174 |
| 3,994,860 | 11/1976 | Brousse | 528/175 |
| 4,113,699 | 9/1978 | Rose | 528/175 |

*Primary Examiner*—Lester L. Lee

[57] ABSTRACT

A semipermeable membrane of a polyaryl ether sulfone having repeating units of the formula,

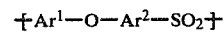

wherein
Ar¹ and Ar² independently represent

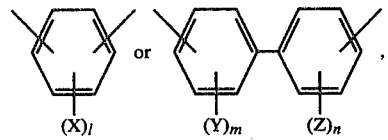

wherein
X, Y and Z independently represents an alkyl group having 1 to 4 carbon atoms, an alkoxy group having 1 to 4 carbon atoms, a chlorine atom or a bromine atom; and l, m and n independently represent zero or an integer of 1 to 4, and having a contact angle of its surface to water of at most 65°.

17 Claims, No Drawings

SEMIPERMEABLE MEMBRANES OF POLYARYL ETHER SULFONES

BACKGROUND OF THE INVENTION

1. Field of the Invention

This invention relates to semipermeable membranes of polyaryl ether sulfones having a high hydrophilicity which can be used in the filtration of water and a process for preparing the same.

2. Description of the Prior Art

As the materials for semipermeable membranes a large number of polymers are presently used. For example, cellulose acetates, polyacrylonitriles and polyamides are industrially produced as the materials for semipermeable membranes.

Also polyaryl sulfones which are used as an engineering plastics have now been employed as the materials for semipermeable membranes due to their good resistance to heat and chemicals. However, the hydrophilicity of polyaryl sulfones is low and accordingly, the semipermeable membranes of polyaryl sulfones have various disadvantages in the filtration of water due to their low wettability to water.

For example, in operating an filtration using an apparatus incorporated with semipermeable membranes, bubbles often get entangled in the apparatus. In case the semipermeable membranes have a low wettability to water, the bubbles adsorb on their surfaces and do not separate therefrom readily and easily, resulting in dead spaces which reduce the filtration rate of the apparatus. Further, the semipermeable membranes having a low wettability to water are easily dried upon exposure to air and as a result the water permeability tends to decrease.

The hydrophilicity and the water permeability of semipermeable membranes of polyaryl ether sulfone can be improved to some extent by introducing sulfonic groups into the aryl groups of the polyaryl ether sulfones (Journal of Applied Polymer Science, Vol. 20, page 1885, 1976). However, the hydrophilicity of the semipermeable membranes of the polyaryl ether sulfones which do not have such strongly acidic atomic groups, i.e., do not have any substituents in the aryl groups or only have non-dissociable substituents in the aryl groups is low and the contact angle of the surfaces of the semipermeable membranes to water is at least 70°.

SUMMARY OF THE INVENTION

According to the present invention there is provided a semipermeable membrane of a polyaryl ether sulfone having repeating units of the formula, $$+Ar^1-O-Ar^2-SO_2+ \quad (I)$$

wherein $Ar^1$ and $Ar^2$ independently represent

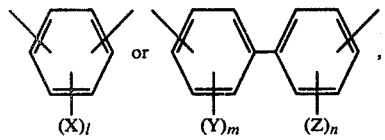

wherein

X, Y and X independently represent an alkyl group having 1 to 4 carbon atoms, an alkoxy group having 1 to 4 carbon atoms, a chlorine atom or a bromine atom; and l, m and n independently represent zero or an integer of 1 to 4, and having a contact angle of its surface to water of at most 65°.

DETAILED DESCRIPTION OF THE INVENTION

The semipermeable membranes of this invention have a contact angle of their surfaces to water of at most 65° as a distinctive feature. The semipermeable membranes having a contact angle of their surfaces to water of 70° or more are low in wettability to water and accordingly, water permeability. On the other hand, the semipermeable membranes of this invention which have a contact angle of their surfaces to water of 65° or less are easily wettable to water and bubbles are difficult to adsorb on their surfaces and as the result the water permeability is increased.

Of the polyaryl ether sulfones having repeating units of the formula (I) as described above which can be employed in this invention, the polyaryl ether sulfones having repeating units of the formula (I) in which $Ar^1$ and $Ar^2$ are

are preferably employed due to their availability. More preferred polyaryl ether sulfones of this invention have repeating units of the formula,

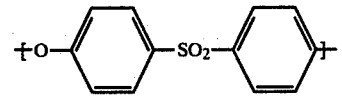

The number average molecular weight of the polyaryl ether sulfones which can be employed in this invention typically ranges from about 5,000 to about 50,000 and preferably from about 10,000 to 30,000 from the viewpoint of the ease of preparing membranes and the mechanical properties of the membranes obtained.

The semipermeable membranes of polyaryl ether sulfones of this invention can be prepared by shaping a casting solution containing a polar organic solution of a polyaryl ether sulfone having repeating units of the formula (I) as described above and an aqueous solution of an electrolyte into a membrane and contacting the membrane with a coagulating liquid which is miscible with the polar organic solvent but is a non-solvent for the polyaryl ether sulfone to effect coagulation.

Exemplary polar organic solvents which can be employed in this invention include dimethyl sulfoxide, N,N-dimethylacetamide, N,N-dimethylformamide and N-methyl-2-pyrrolidone and any mixtures thereof. Of these polar organic solvents, dimethyl sulfoxide and the mixtures of dimethyl sulfoxide with N,N-dimethylacetamide, N,N-dimethylformamide or N-methyl-2-pyrrolidone are preferred from the viewpoint of the solubilities therein of the polyaryl ether sulfones and the electrolytes.

Suitable electrolytes which can be used in this invention include metal salts of inorganic acids, metal salts of organic acids high molecular weight electrolytes and ionic surfactants. Exemplary metal salts of inorganic acids include sodium hydroxide, potassium chloride, potassium nitrate, sodium sulfate, potassium sulfate and zinc chloride. Exemplary metal salts of organic acids include sodium acetate, sodium formate, sodium succinate and sodium oxalate. Exemplary high molecular weight electrolytes include polystyrene sodium sulfonate and polyvinyl benzyltrimethylammonium chloride. Exemplary ionic surfactants include N-oleoyl-N-methyl-2-aminoethane sodium sulfonate, N-lauryl-N-methyl-2-aminoethane sodium sulfonate, octadecyltrimethylammonium chloride and dodecyltrimethylammonium chloride.

When the electrolytes used in this invention are employed in the form of an aqueous solution thereof, the advantages of this invention are markedly produced.

The concentration of the electrolyte in the aqueous solution is not particularly limited, but with higher concentrations the effect of the electrolyte is markedly observed. Typically the concentration of the electrolyte ranges from about 1 percent by weight to about 60 percent by weight.

The amount of the aqueous solution of an electrolyte, based on the volume of the polar organic solvent, which can be employed in this invention may be varied within wide limits as long as the casting solution can be maintained uniform. The amount of the aqueous solution of an electrolyte typically ranges from about 0.5 percent by volume to about 10 percent by volume.

The casting solution of this invention may be prepared either by firstly dissolving the aqueous solution of an electrolyte in the polar organic solvent and secondly dissolving the polyaryl ether sulfone in the resulting solution or by firstly dissolving the polyaryl ether sulfone in the polar organic solvent and secondly dissolving the aqueous solution of an electrolyte in the resulting solution. In order to obtain a uniform casting solution in a short period of time, the former method is preferred.

The temperature of dissolving the polyaryl ether sulfone in the polar organic solvent or in a solution of the polar organic solvent and the aqueous solution of an electrolyte typically ranges from about 10° C. to about 100° C.

The concentration of the polyaryl ether sulfone in the casting solution typically ranges from about 5 percent by weight to about 35 percent by weight and preferably from about 10 percent by weight to about 30 percent by weight. With concentrations of the polyaryl ether sulfone of more than about 35 percent by weight, the water permeability of the semipermeable membranes obtained is too low for practical uses. Also, with concentrations of less than about 5 percent by weight, the strength of the semipermeable membranes obtained is insufficient.

The semipermeable membranes of this invention may be of any desired shapes including flat membranes and hollow fibers, and any conventional methods for preparing semipermeable membranes can be employed in the preparation of the semipermeable membranes of this invention. For example, in obtaining the semipermeable membrane in the form of a flat membrane, the casting solution is poured onto a plane surface such as a metal or glass plate and a metal belt for continuous production. The support can also be cylindrical, conical, spiral or any other desired shape. Then, the cast flat membrane on the support is immersed in a coagulation bath to effect coagulation. In obtaining the semipermeable membrane in the form of a hollow fiber the casting solution is extruded through a ring form spinning nozzle for preparing hollow fibers and at the same time an internal coagulating liquid for the casting solution is passed through the center of the ring form spinning nozzle and the casting solution and the coagulating liquid are led to a coagulation bath to effect coagulation.

The coagulating liquids which are used as the internal coagulating liquid and the coagulation bath where the cast flat membrane is immersed or the casting solution is passed from the spinning nozzle are liquids which are miscible with the polar organic solvent but are non-solvents for the polyaryl ether sulfone. Exemplary coagulating liquids include water, methanol, ethanol and ethylene glycol and any mixtures thereof. Of these liquids, water is preferably employed. In preparing a semipermeable membrane in the form of a hollow fiber the internal coagulating liquid and the coagulation bath and their compositions may be the same or different.

With regard to water employed as the coagulating liquid, the temperature of the coagulating liquid is typically in the range of from about 0° C. to about 80° C.

The semipermeable membranes of this invention have pores of an average pore diameter of about 10 Å to about 0.5μ on their surface portion which has been contacted with the coagulating liquid and the interior portion of the membrane is formed of a porous layer having pores of an average pore diameter of about 500 Å to about 5μ and the porous layer may have voids of a diameter of about 10μ or more where the polyaryl ether sulfone forming the membrane is deficient.

More specifically, with regard to the semipermeable membrane in the form of a flat membrane obtained by casting the casting solution on a plane surface of a support, the average pore diameter of pores on the outer surface portion of the membrane which has been contacted with a coagulating liquid ranges from about 10 Å to about 0.5μ and the interior portion of the membrane is formed of a porous layer having an average pore diameter of from about 500 Å to about 5μ which continues to the inner surface of the membrane which has been contacted with the plane surface of the support. With regard to the semipermeable membrane in the form of a hollow fiber obtained by coagulating the casting solution from both the inside and the outside of the extruded casting solution, the average pore diameter on both the outer surface portion and the inner surface portion of the membrane which have been contacted with a coagulating liquid ranges from about 10 Å to about 0.5μ.

The present invention will now be illustrated in more detail by several non-limiting examples.

EXAMPLE 1

To 98 ml of dimethyl sulfoxide were added 2 ml of a 10 percent by weight aqueous sodium acetate solution to form a uniform solution. In this solution was dissolved at 50° C. 25 g of a polyaryl ether sulfone having repeating units of

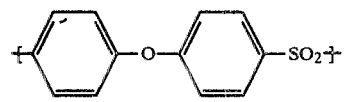

and a number average molecular weight of 22,000 ("Polyethersulfone 300P", made by Imperical Chemical Industries Ltd.) to obtain a casting solution having a viscosity of about 2,900 cp. measured at 20° C. The casting solution was drawn down in a 0.25 mm flat membrane on a glass plate and then the whole was immersed in water at 20° C. for 2 hours and the coagulated membrane was washed with water to remove the solvent, resulting in a semipermeable membrane. The water permeability of the semipermeable membrane thus prepared measured at 20° C. by using pure water was 4.3 $m^3/m^2\cdot day\cdot Kg/cm^2$ and the rejection percentage at 20° C. of dextran having a molecular weight of 70,000 was 50 percent. After the semipermeable membrane was dried, a water contact angle to the surface of the membrane which had been contacted with water as a coagulating liquid, i.e., the outer surface having smaller pores was measured at 20° C. using a goniometer type device for measuring a contact angle made by Elma Optics Co., Ltd., Japan and was 64°.

COMPARATIVE EXAMPLE

In 100 ml of dimethyl sulfoxide was dissolved at 50° C. 25 g of the same polyaryl ether sulfone as in Example 1 to give a casting solution and from the polymer solution was obtained a semipermeable membrane in the same manner as in Example 1.

The water permeability at 20° C. of the membrane was 0.4 $m^3/m^2\cdot day\cdot Kg/cm^2$ which was about one hundredth of that as in Example 1.

The membrane-water contact angle measured in the same manner as in Example 1 was 74° and more hydrophobic than the membrane as in Example 1.

EXAMPLE 2

To 96 ml of dimethyl sulfoxide was added 4 ml of a 30 percent by weight aqueous sodium nitrate solution to give a uniform solution. In this solution were dissolved at 50° C. 25 g of the same polyaryl ether sulfone as in Example 1 to give a casting solution having a viscosity of 1,350 cp. measured at 20° C. From the casting solution was obtained a semipermeable membrane in the same manner as in Example 1.

The water permeability at 20° C. of the membrane with pure water was 1.7 $m^3/m^2\cdot day\cdot Kg/cm^2$ and the rejection percentage at 20° C. of dextran having a molecular weight of 70,000 was 98 percent.

The membrane-water contact angle measured in the same manner as in Example 1 was 56°.

EXAMPLE 3

To a mixed solvent of 34 ml of dimethyl sulfoxide and 62 ml of N-methyl-2-pyrrolidone was added 4 ml of a 30 percent by weight aqueous sodium nitrate solution to give a uniform solution. In this solution was dissolved at 50° C. 25 g of the same polyaryl ether sulfone as in Example 1 to give a casting solution having a viscosity of 1,500 cp. measured at 20° C. From the casting solution was obtained a semipermeable membrane in the same manner as in Example 1.

The water permeability at 20° C. of the membrane with pure water at 20° C. was 2.0 $m^3/m^2\cdot day\cdot Kg/cm^2$ and the rejection percentage at 20° C. of dextran having a number average molecular weight of 70,000 was 95 percent.

The membrane-water contact angle measured in the same manner as in Example 1 was 55°.

EXAMPLE 4

To 98 ml of dimethyl sulfoxide was added 2 ml of a 5 percent by weight aqueous polystyrene sodium sulfonate solution, and in the resulting solution was uniformly dissolved at 50° C. 25 g of the same polyaryl ether sulfone as in Example 1 to give a casting solution having a viscosity of 2,600 cp. at 20° C. From the casting solution was obtained a semipermeable membrane in the same manner as in Example 1.

The water permeability at 20° C. of the membrane with pure water was 5.0 $m^3/m^2\cdot day\cdot Kg/cm^2$ and the rejection percentage at 20° C. of dextran having a molecular weight of 70,000 was 57 percent.

The membrane-water contact angle measured in the same manner as in Example 1 was 62°.

EXAMPLE 5

To 98 ml of dimethyl sulfoxide was added 2 ml of a 10 percent by weight aqueous dioctyl sodium sulfosuccinate $[(C_8H_{17}OCOCH_2)(C_8H_{17}OCO)CHSO_3Na]$ solution and in the resulting solution was uniformly dissolved at 50° C. 25 g of the same polyaryl ether sulfone as in Example 1 to give a casting solution having a viscosity of 2,240 cp. at 20° C. From the casting solution was obtained a semipermeable membrane in the same manner as in Example 1.

The water permeability at 20° C. of the membrane with pure water was 1.8 $m^3/m^2\cdot day\cdot Kg/cm^2$ and the rejection percentage at 20° C. of dextran having a molecular weight of 70,000 was 85 percent.

The membrane-water contact angle measured in the same manner as in Example 1 was 65°.

EXAMPLE 6

In 3,920 ml of dimethyl sulfoxide was uniformly dissolved 80 ml of a 50 percent by weight aqueous sodium nitrate solution, and in the resulting solution was dissolved at 50° C. 1 Kg of the same polyaryl ether sulfone as in Example 1 to give a casting solution. The casting solution was extruded through a ring form nozzle for preparing hollow fibers into water at 20° C. and at the same time water was passed through the center of the ring form spinning nozzle to coagulate the casting solution and was obtained a hollow fiber having an outside diameter of 1.1 mm and an inside diameter of 0.8 mm.

The water permeability at 20° C. of the hollow fiber with pure water was 3.3 $m^3/m^2\cdot day\cdot Kg/cm^2$ and the rejection percentage at 20° C. of dextran having a molecular weight of 70,000 was 68 percent.

After the hollow fiber was dried, a water contact angle was measured at 20° C. by an inclination method using a device for precisely measuring a water contact angle made by Kyowa Science Co., Ltd., Japan and was 62°.

As described above, the semipermeable membranes of the present invention have a smaller membrane-water contact angle and a higher wettability to water than conventional semipermeable membranes of polyaryl ether sulfones, and as the result, the filtration rate of water with the semipermeable membranes of this invention is hardly reduced by entangling bubbles. Further, the water permeability of the semipermeable membranes of this invention is higher than that of conventional semipermeable membranes. Thus, the semipermeable membranes of this invention are superior in the filtration of water.

What is claimed is:

1. A semipermeable membrane of a polyaryl ether sulfone having repeating units of the formula,

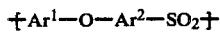

wherein
Ar$^1$ and Ar$^2$ independently represent

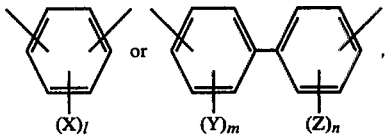

wherein
X, Y and Z independently represent an alkyl group having 1 to 4 carbon atoms, an alkoxy group having 1 to 4 carbon atoms, a chlorine atom or a bromine atom; and l, m and n independently represent zero or an integer of 1 to 4, and having a contact angle of its surface to water of at most 65°.

2. The semipermeable membrane as claimed in claim 1, wherein the polyaryl ether sulfone has a number average molecular weight of from about 5,000 to about 50,000.

3. The semipermeable membrane as claimed in claim 1, wherein the polyaryl ether sulfone has repeating units of the formula,

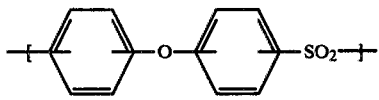

4. The semipermeable membrane as claimed in claim 1, wherein the polyaryl ether sulfone has repeating units of the formula,

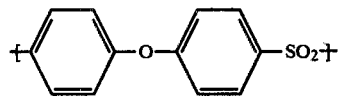

5. The semipermeable membrane as claimed in claim 4, wherein the polyaryl ether sulfone has a number average molecular weight of from about 10,000 to about 30,000.

6. The semipermeable membrane as claimed in claim 1, wherein the semipermeable membrane is a flat membrane.

7. The semipermeable membrane as claimed in claim 1, wherein the semipermeable membrane is a hollow fiber.

8. A process for preparing a semipermeable membrane as claimed in claim 1 which comprises shaping a casting solution containing a polar organic solution of a polyaryl ether sulfone having repeating units of the formula

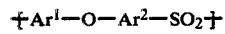

wherein
Ar$^1$ and Ar$^2$ independently represent

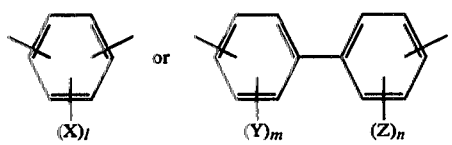

wherein
X, Y and Z independently represents an alkyl group having 1 to 4 carbon atoms, an alkoxy group having 1 to 4 carbon atoms, a chlorine atom or a bromine atom; and l, m and n independently represents zero or an integer of 1 to 4, and an aqueous solution of an electrolyte into a membrane and contacting the membrane with a liquid which is miscible with the polar organic solvent but is a non-solvent for the polyaryl ether sulfone to effect coagulation.

9. The process as claimed in claim 8, wherein the polyaryl ether sulfone has repeating units of the formula,

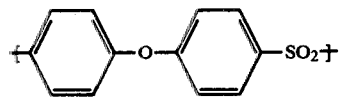

and a number average molecular weight of about 5,000 to about 50,000.

10. The process as claimed in claim 8, wherein the polyaryl ether sulfone has repeating units of the formula,

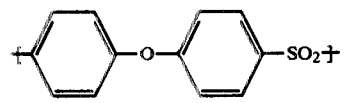

and a number average molecular weight of about 10,000 to about 30,000.

11. The process as claimed in claim 8, wherein the polar organic solvent is at least one member selected from the group consisting of dimethyl sulfoxide, N,N-dimethylacetamide, N,N-dimethylformamide and N-methyl-2-pyrrolidone.

12. The process as claimed in claim 11, wherein the polar organic solvent is dimethyl sulfoxide or a mixture of dimethyl sulfoxide with N,N-dimethylacetamide, N,N-dimethylformamide or N-methyl-2-pyrrolidone.

13. The process as claimed in claim 8, wherein the electrolyte is at least one member selected from the group consisting of metal salts of inorganic acids, metal salts of organic acids, high molecular weight electrolytes and ionic surfactants.

14. The process as claimed in claim 13, wherein the electrolyte is sodium nitrate.

15. The process as claimed in claim 8, wherein the coagulating liquid is water.

16. The process as claimed in claim 8, wherein the concentration of the polyaryl ether sulfone in the casting solution ranges from about 5 percent by weight to 35 percent by weight.

17. The process as claimed in claim 16, wherein the concentration of the polyaryl ether sulfone in the casting solution ranges from about 10 percent by weight to about 30 percent by weight.

* * * * *